(12) United States Patent
Zackovich et al.

(10) Patent No.: US 7,100,933 B2
(45) Date of Patent: Sep. 5, 2006

(54) FIFTH WHEEL MOUNTING FRAME

(75) Inventors: Stanley E. Zackovich, Cle Elum, WA (US); David B. Stine, South Cle Elum, WA (US)

(73) Assignee: Zacklift International, Inc., Cle Elum, WA (US)

(*) Notice: Subject to any disclaimer, the term of this patent is extended or adjusted under 35 U.S.C. 154(b) by 282 days.

(21) Appl. No.: 10/633,331

(22) Filed: Jul. 31, 2003

(65) Prior Publication Data

US 2005/0023797 A1 Feb. 3, 2005

(51) Int. Cl.
*B60F 5/00* (2006.01)

(52) U.S. Cl. ............... 280/415.1; 280/402; 280/418.1; 280/433

(58) Field of Classification Search ............ 280/433, 280/402, 415.1, 416.1, 417.1, 418.1, 441.1, 280/441.2
See application file for complete search history.

(56) References Cited

U.S. PATENT DOCUMENTS

| | | | | |
|---|---|---|---|---|
| 4,141,568 A | * | 2/1979 | Donnelly | 280/418.1 |
| 4,555,214 A | * | 11/1985 | Morton | 414/563 |
| 4,781,516 A | * | 11/1988 | Cripe et al. | 414/555 |
| 5,409,345 A | * | 4/1995 | Pinkston | 414/563 |
| 5,709,522 A | | 1/1998 | Cullum | |
| 5,779,431 A | | 7/1998 | Alm et al. | |
| 5,823,735 A | | 10/1998 | Kooima | |
| 6,036,428 A | | 3/2000 | Kooima | |
| 6,089,818 A | * | 7/2000 | Hill et al. | 414/563 |
| 6,092,975 A | | 7/2000 | Cannon, Jr. et al. | |
| 6,148,928 A | * | 11/2000 | Spears | 172/439 |
| 6,276,890 B1 | | 8/2001 | Pratt | |
| 6,302,423 B1 | * | 10/2001 | Alexander | 280/415.1 |
| 6,336,783 B1 | * | 1/2002 | Young et al. | 414/563 |

OTHER PUBLICATIONS

Holmes International/Dover Corporation, Operation & Service Holmes Towing Device FW35, Mar. 1983, 12 pages, Publication No. 81–309, Chattanooga, TN 37407.
Ernest Holmes Co., The Holmes FW–20 5th Wheel Wrecker Unit, Oct. 1978, 5 pages, Publication No. 73–117, Chattanooga, TN 37407.
Ernest Holmes Co./Dover Corporation, Holmes FW–20 Wrecker Operation & Service, Jun. 1974, 8 pages, Publication No. 73–115, Chattanooga, TN 37407.
Holmes International Inc., Holmes FW–25 5th Wheel Unit, Predates filing date of subject patent application, 2 pages, Publication No. 88469, Chattanooga, TN 37407.

* cited by examiner

*Primary Examiner*—Lesley D. Morris
*Assistant Examiner*—L. Lum
(74) *Attorney, Agent, or Firm*—Brian L. Johnson; Brian G. Bodine; Davis Wright Tremaine LLP

(57) ABSTRACT

A fifth wheel mounting frame can be used to convert a conventional vehicle having a fifth wheel, such as the semi-tractor, into a tow truck. The fifth wheel mounting frame advantageously mounts to the tow vehicle's fifth wheel assembly to provide stability and other advantages. Additionally, various coupling members having selectably adjustable lengths and having various coupling mechanisms are used for variable placement of the coupling mechanisms and coupling members to the frame of the fifth wheel vehicle to accommodate such things as obstructions found on the vehicle frame.

6 Claims, 17 Drawing Sheets

FIFTH WHEEL MOUNTING FRAME

BACKGROUND OF THE INVENTION

1. Field of the Invention

The present invention is directed generally to mounting frames and, more particularly, to a universal mounting frame for towing.

2. Description of the Related Art

Conventional tow trucks are designed to lift and tow a vehicle (e.g., an automobile) in a known manner. The disadvantage of a conventional tow truck is that it is specialized only for towing vehicles. Instead of tow trucks, specialized vehicles, such as a tractor trailer, are used to pull trailers for purposes such as transport of goods and other items. These specialized vehicles have a device known as a "fifth wheel" to permit coupling to a trailer in a conventional fashion. The trailer is equipped with a kingpin that mates with the fifth wheel. In normal operation, a significant downward force is applied to the fifth wheel by the weight of the trailer under tow and the contents, if any, of the trailer.

Past attempts have been made to provide a towing vehicle that is capable of operation as a normal tow truck (i.e., lifting and towing a vehicle) as well as operation with a fifth wheel. Such devices are disclosed by way of example in U.S. Pat. Nos. 5,823,735 and 6,036,428. In those references, a towing adapter is attached to the fifth wheel mounting plate of the tow vehicle. That is, an adapter is mounted on the tow vehicle and coupled to the tow vehicle's fifth wheel to permit the tow vehicle to operate as a conventional tow truck. This technique allows the tow vehicle to be used both for conventional towing and for towing a trailer via the fifth wheel.

The disadvantage of this technique is that the towing adapter allows an upward force to be applied to the fifth wheel. As previously noted, the fifth wheel is designed for operation with a trailer wherein the trailer applies a significant downward force to the fifth wheel. The fifth wheel is typically designed to accommodate this downward force and retain the trailer kingpin within the fifth wheel. However, when a towing adaptor is mounted to the tow vehicle via the fifth wheel, upward forces are applied to the fifth wheel. This is particularly true when the tow vehicle attaches to and lifts a vehicle under tow (e.g., an automobile). The weight of the vehicle under tow applies a significant downward force to the back of the towing adapter, which rests on the rear of the frame of the trailer. This downward force is applied through a moment arm to a pivot point in the towing adapter and translated to an upward force at the fifth wheel. The translation of these forces is similar to the forces applied to a teeter-totter where a downward force applied to one end of the teeter-totter is translated into an upward force at the opposite end of the pivot arm.

The fifth wheel is designed for operation with a trailer that exerts a downward force on the fifth wheel, but is not designed to accommodate such upward forces. The result is an undesirable upward force applied by the kingpin to the fifth wheel plate. To prevent such upward force, the device disclosed in the aforementioned patents includes a pair of link members coupled between the towing frame and the vehicle frame to resist upward force of the kingpin with respect to the fifth wheel plate.

The same approach is taken in a towing adapter widely sold by the Ernest Holmes Company, which manufactured a towing adapter mounted to the tow vehicle via the fifth wheel. In devices sold by Holmes, ratchet binders or chains and load binders are coupled between the tow frame and the frame of the tow vehicle to resist upward force of the kingpin at the fifth wheel plate.

Unfortunately, these conventional approaches involve expensive and lengthy assembly and potential risk of significant instability of the coupling between the kingpin and the fifth wheel unless extra steps are taken to mount link arms or ratchet binders to resist the upward force applied by the kingpin to the fifth wheel plate.

BRIEF SUMMARY OF THE INVENTION

The present invention resides in a fifth wheel mounting frame. Embodiments include a system to be connected to a vehicle, the vehicle having a fifth wheel plate, a driver compartment, and first and second frame members substantially parallel and extending rearwardly away from the driver compartment on either side of the fifth wheel plate, the first and second frame members each having forward portions located nearer to the driver compartment than the fifth wheel plate is to the driver compartment, the first and second frame members each having rearward portions located farther from the driver compartment than the fifth wheel plate is from the driver compartment.

The system includes a member with a rearward portion, a forward portion, and a mid-portion between the rearward and forward portions along a longitudinal dimension. The member has a surface on the mid-portion configured for placement on top of the fifth wheel plate when the system is in an operational position on the vehicle to allow the rearward portion to be farther from the driver compartment than the forward portion is from the driver compartment.

The system further includes a first forward attachment member configured for attachment to the forward portion of the first frame member, a second forward attachment member configured for attachment to the forward portion of the second frame member, a first rearward attachment member configured for attachment to the rearward portion of the first frame member, a second rearward attachment member configured for attachment to the rearward portion of the second frame member. The system further includes a first forward coupling member configured to be coupled to the forward portion of the member and configured for attachment to the first forward attachment member when the system is in the operational position on the vehicle, the first forward coupling member having selectably adjustable length to accommodate placement of the first forward attachment member on the forward portion of the first frame member.

The system further includes a second forward coupling member configured to be coupled to the forward portion of the member and configured for attachment to the second forward attachment member when the system is in the operational position on the vehicle, the second forward coupling member having selectably adjustable length to accommodate placement of the second forward attachment member on the forward portion of the second frame member. The system further includes a first rearward coupling member configured to be coupled to the rearward portion of the member and configured for attachment to the first rearward attachment member when the system is in the operational position on the vehicle, the first rearward coupling member having selectably adjustable length to accommodate placement of the first rearward attachment member on the rearward portion of the first frame member.

The system further includes a second rearward coupling member configured to be coupled to the rearward portion of the member and configured for attachment to the second rearward member when the system is in the operational position on the vehicle, the second rearward coupling member having selectably adjustable length to accommodate placement of the second rearward attachment member on the rearward portion of the second frame member.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

Figure 1:
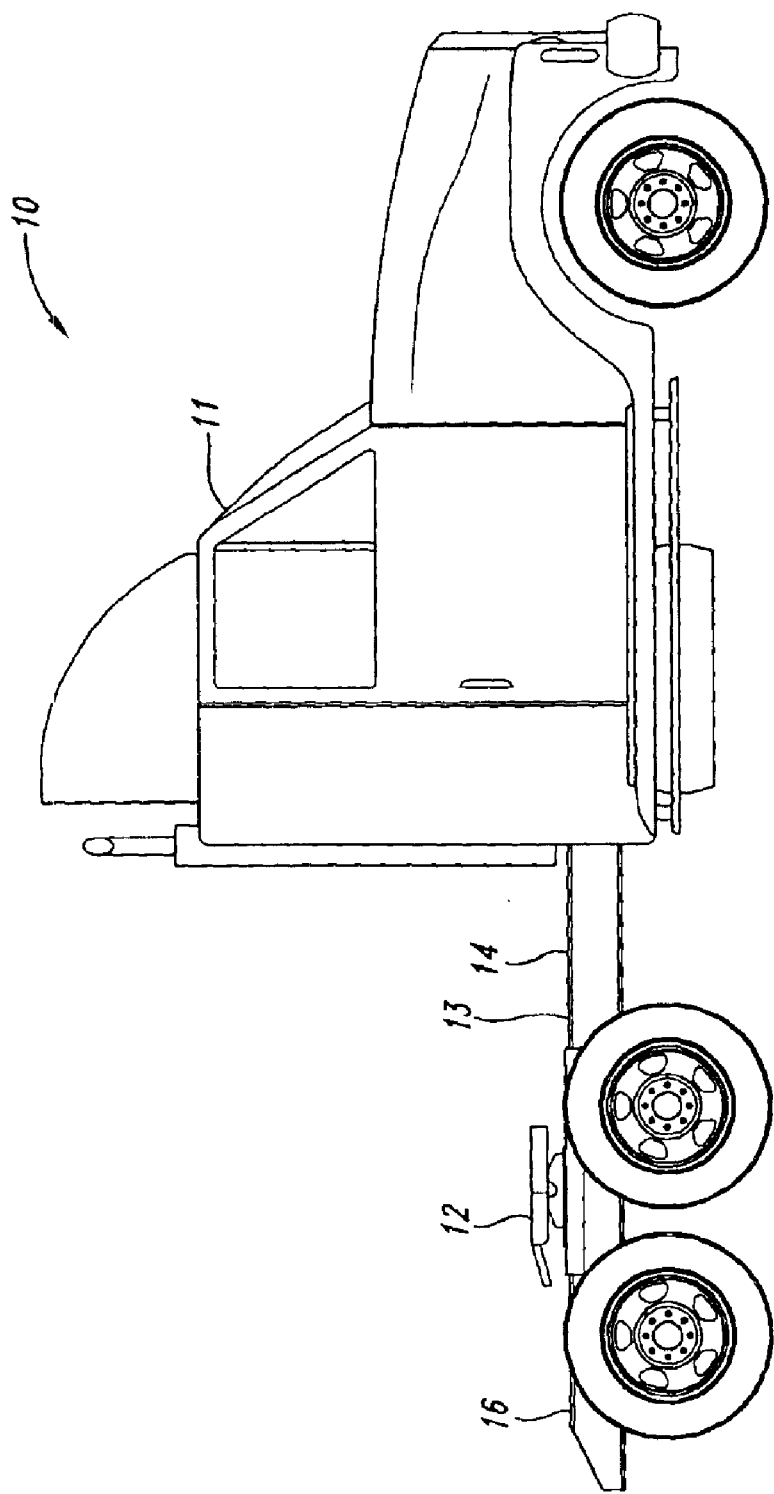
FIG. 1 is a side elevational view of a conventional fifth wheel vehicle with a dual axle.

As will be discussed in greater detail herein, a fifth wheel mounting frame disclosed herein can be readily mounted or removed from a vehicle having a fifth wheel and utilizes the load bearing nature of the vehicle's fifth wheel for stability and ease of assembly. The mounting frame is referred to as a "fifth wheel mounting frame" because of its adaptability and ease of mounting to a variety of vehicles having a fifth wheel such as a conventional fifth wheel vehicle 10 having a driver compartment 11, such as a cab as depicted, and a fifth wheel plate 12 such as that shown in FIG. 1. The fifth wheel vehicle 10 further includes a pair of substantially parallel longitudinal frame members 13 extending rearward from the driver compartment 11 on either side of the fifth wheel plate 12 having front frame portions 14 and rear frame portions 16, the rear frame portions being farther from the vehicle compartment 11 than the front frame portions. As discussed below, these front frame portions 14 and rear frame portions 16 are used for mounting of the fifth wheel mounting frame to the fifth wheel vehicle 10.

Figure 2:
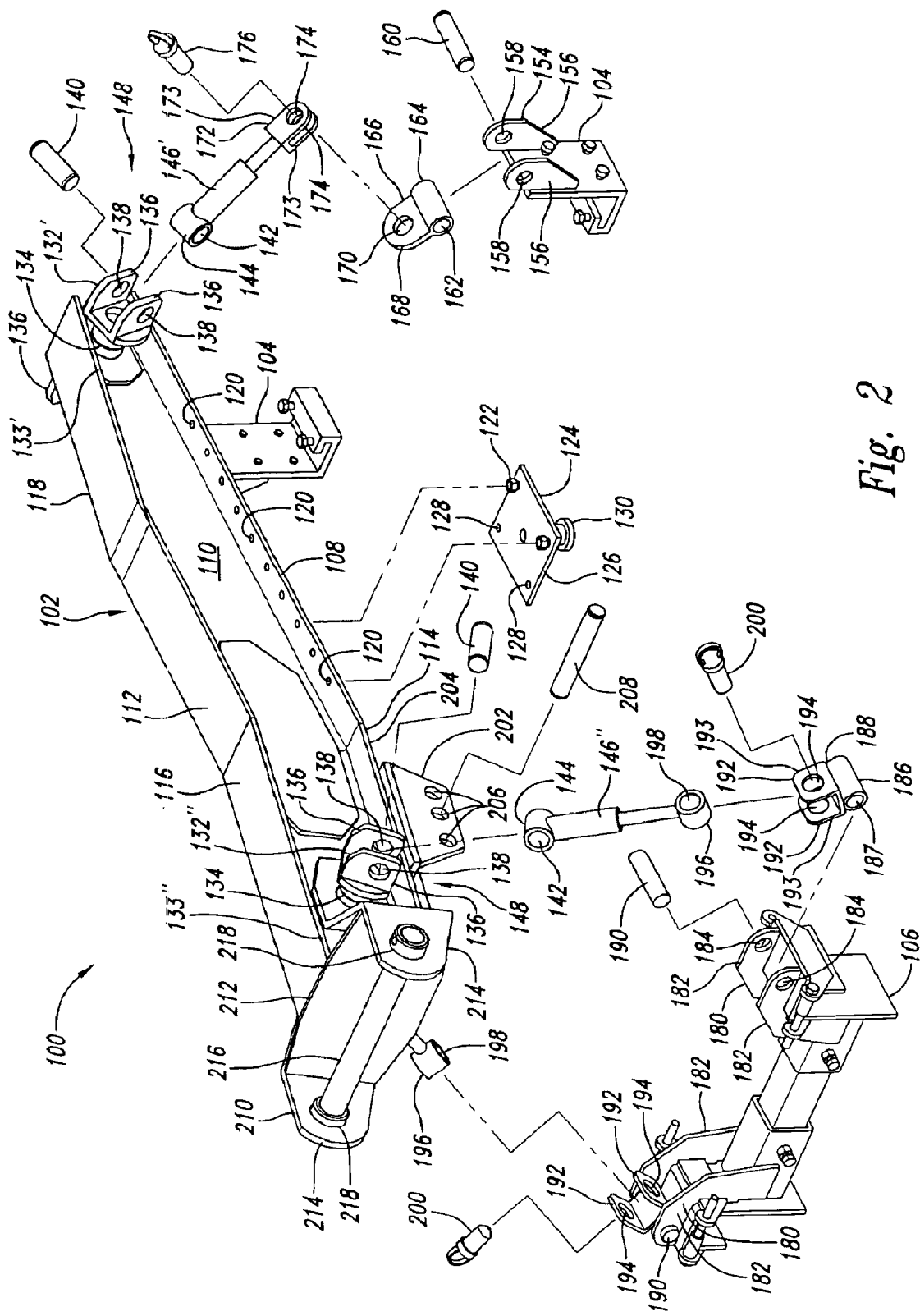
FIG. 2 is an exploded isometric view of the fifth wheel mounting frame.

An implementation of the fifth wheel mounting frame is depicted in FIG. 2 as a mounting frame system 100 having a longitudinal beam assembly 102, front frame connectors 104, and a rear frame connector assembly 106. The longitudinal beam assembly 102 is generally fashioned as a modified I-beam like structure including a lower horizontal member 108, a vertical member 110, and an upper horizontal member 112. The vertical member 110 spans between the lower horizontal member 108 and the upper horizontal member 112. In some implementations of the mounting frame system 100, the lower horizontal member 108 has a lower canted member 114 and the upper horizontal member 112 as an upper rear canted member with the vertical member 110 shaped to also spans between these portions of the lower and upper horizontal members. The upper horizontal member 112 also includes an upper forward canted member 118, which reduces the span of the vertical member 110 between the lower horizontal member 108 and the upper horizontal member 112 in the area of the upper forward canted member.

The lower horizontal member 108 includes positioning holes 120 for bolts 122 to secure a kingpin assembly 124 having a plate 126, threaded holes 128, and a kingpin 130 to the lower horizontal member. With the kingpin assembly 124 attached to the lower horizontal member 108, the longitudinal beam assembly 102 can be coupled to the fifth wheel plate 12 by insertion of the kingpin 130 into a fifth wheel slot 18, shown in FIG. 3, of the fifth wheel plate.

The mounting frame system 100 further has tube brackets that include front mounted tube brackets 132' pivotally mounted to a front portion 133' and a rear mounted tube brackets 132" pivotally mounted to a rear portion 133" of the vertical member 110 through rotational couplings 134 on either side of the vertical member. Location of the rotational coupling 134 on the rear portion 133' of the vertical member 110 is so near to the fifth wheel plate 12 that force imparted on to the fifth wheel plate by the longitudinal beam assembly 102 remains positive when loads, such as vehicles being lifted and towed, are bore by the mounting frame system 100 as described further below. Each of the front mounted tube brackets 132' and the rear mounted tube brackets 132" has a pair of support plates 136 in juxtaposition to one another and each has a hole 138 to receive a pin 140. Once a tube end 142 with a hole 144 of a front coupling rod 146' or a rear coupling rod 146" is placed between one of the pairs of the support plates 136, the pin 140 is then inserted into the holes 138 of the support plates and the hole of the tube end. Consequently, the front coupling rod 146' or the rear coupling rod 146" are pivotally coupled to the tube bracket 132. Since the tube bracket 132 is pivotally connected to the longitudinal beam assembly 102, a two-axis joint is formed between the front coupling rod 146' or the rear coupling rod 146" and the longitudinal beam assembly 102. In some implementations, the front and rear coupling rods 146' and 146" have adjustable length to allow for more varied placement along the longitudinal frame members 13.

Each of the front frame connectors 104 has a tube bracket 154 with support plates 156 in juxtaposition. Furthermore, each of the support plates 156 has a hole 158 to receive a pin 160 once a tube 162 having a hole 164 of a tube-plate member 166 has been positioned between the support plates. The tube-plate member 166 further includes a plate 168 with a hole 170. Each of the front coupling rods 146' have a plate bracket 172 with support plates 173 in juxtaposition. Each of the support plates 173 of one of the plate brackets 172 has a hole 174 to receive a pin 176 once the plate 168 of the tube-plate member 166 has been positioned between the support plates 173 to align the hole 170 of the plate of the tube-plate member with the holes of the support plates of the plate bracket. Coupling the tube bracket 154 of each of the front frame connectors 104 to the plate bracket 172 of one of the front coupling rods 146' forms a two-axis joint between the front coupling rod and the front frame connector 104. Since the front coupling rods 146' are coupled through use of two-axis joints to both the front portion 133' of the longitudinal beam assembly 102 and also the front frame portions 14 of the fifth wheel vehicle 10, placement of the front frame connectors 104 on to the front frame portions can be readily adjusted depending upon placement of other items that may be occupying space along the front frame portions.

The rear frame connector assembly 106 has two tube brackets 180 for coupling to the two rear coupling rods 146". Each of the tube brackets 180 of the rear frame connector assembly 106 has two support plates 182 each with a hole 184. A tube 186 having a hole 187 of a tube-tube bracket member 188 is placed between the support plates 182 to align the holes of the support plates with the hole of the tube-tube bracket member to be then secured by a pin 190. The tube-tube bracket member 188 has support plates 193 each with a hole 194. Each of the rear coupling rods 146" has a second tube end 196 with a hole 198 to be placed between the support plates 193 to align the holes of the support plates with the hole of the second tube end to be then secured by a pin 200.

A piston bracket 202 is coupled to a bottom surface 204 of the lower canted member 114. The piston bracket 202 has holes 206 sized to receive a pin 208 to retain a hydraulic piston used to adjust position of an engagement assembly, such as a lift, which is described below. Attached to the rear portion 133" of the longitudinal beam assembly 102 is a lift bracket 210 with support plates 214 in juxtaposition with a rod 216 spanning between the support plates and secured by fasteners 218 such as nuts or welds. The rod 216 is used to support the hydraulic piston for the lift as further described below.

Figure 3:
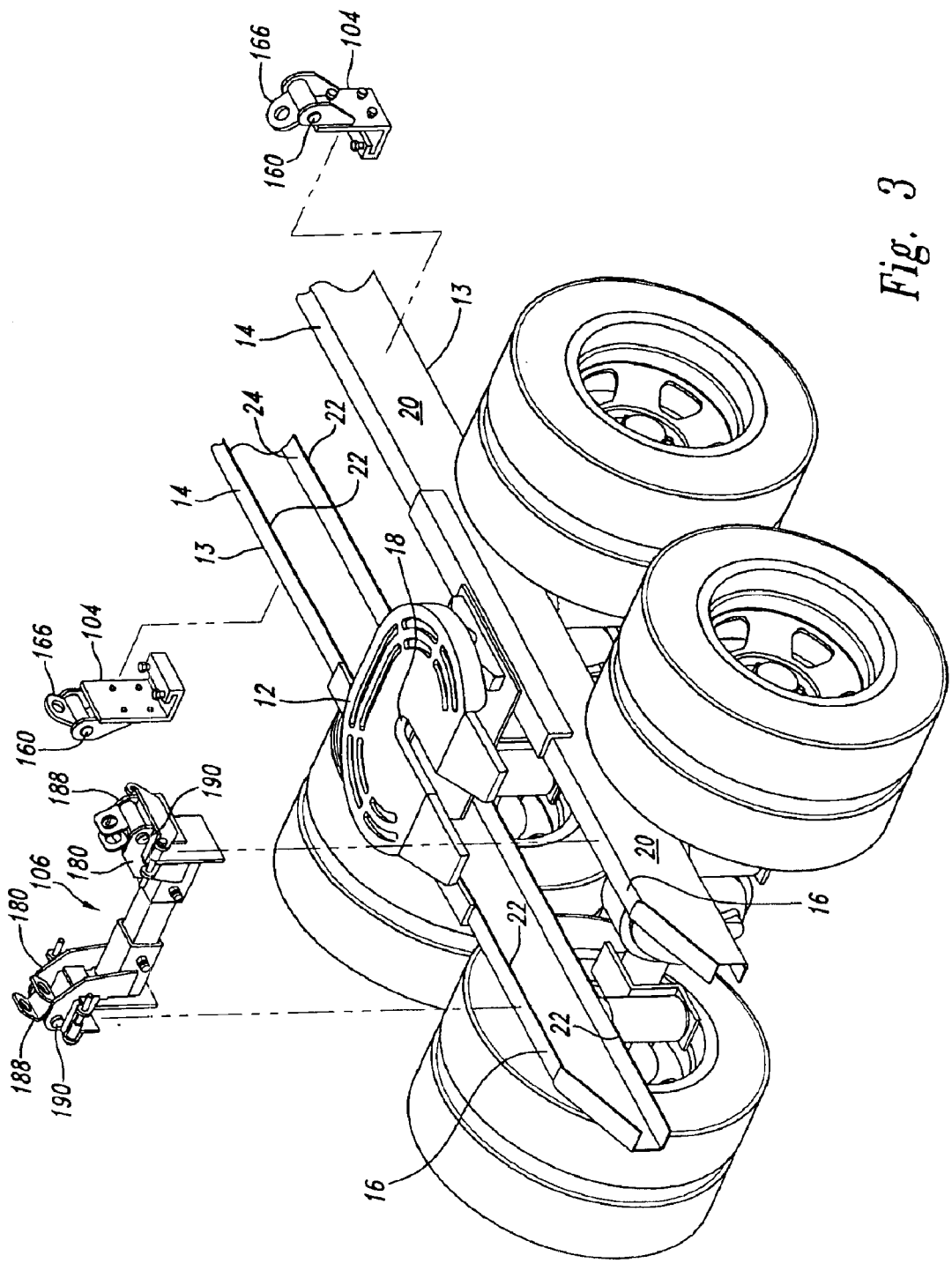
FIG. 3 is an isometric view of the front frame connectors and the rear frame connector assembly showing positioning of such with respect to the frame of the conventional fifth wheel vehicle of FIG. 1.
Figure 4:
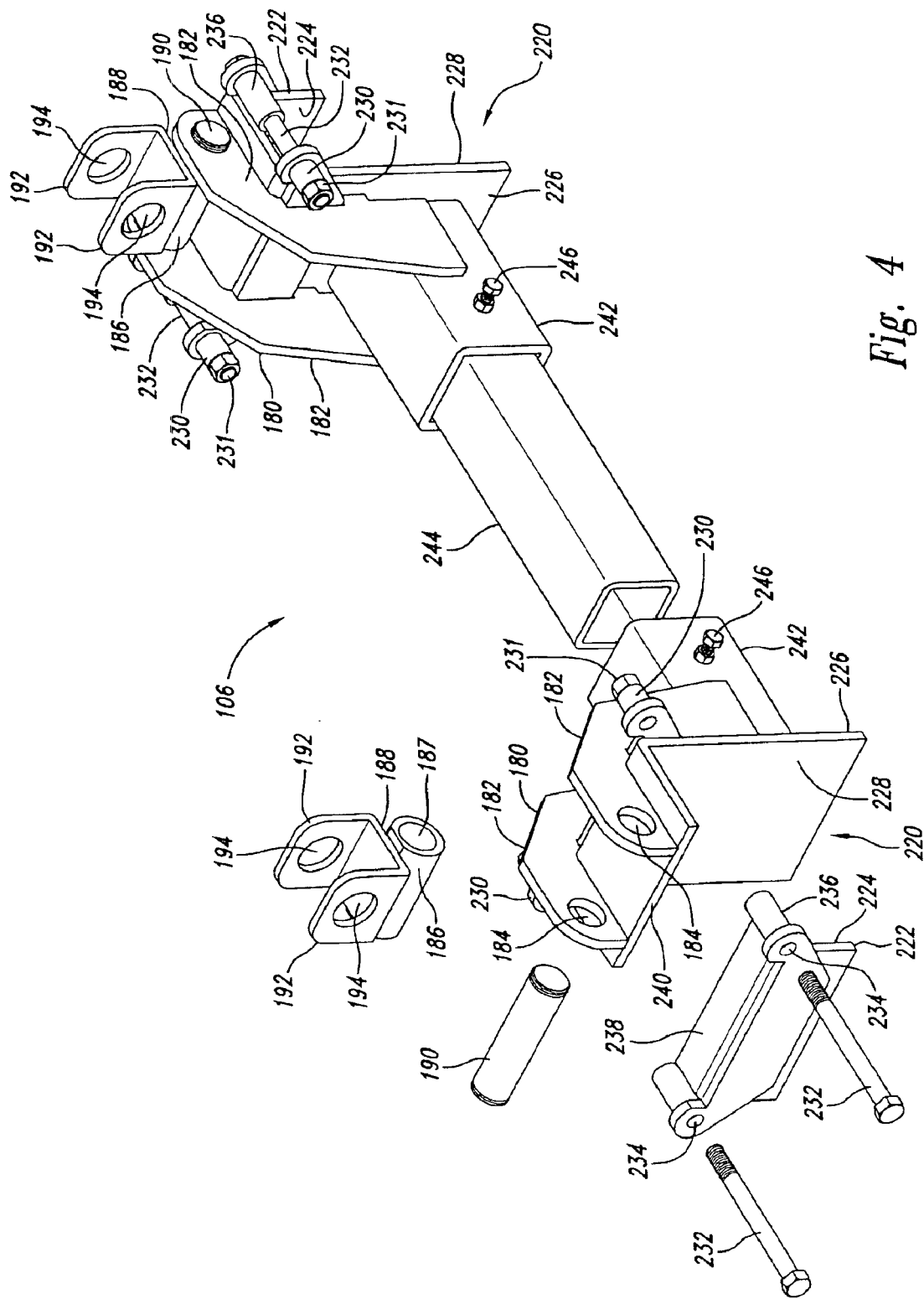
FIG. 4 is an enlarged exploded isometric view of the rear frame connector assembly of FIG. 3.
Figure 5:
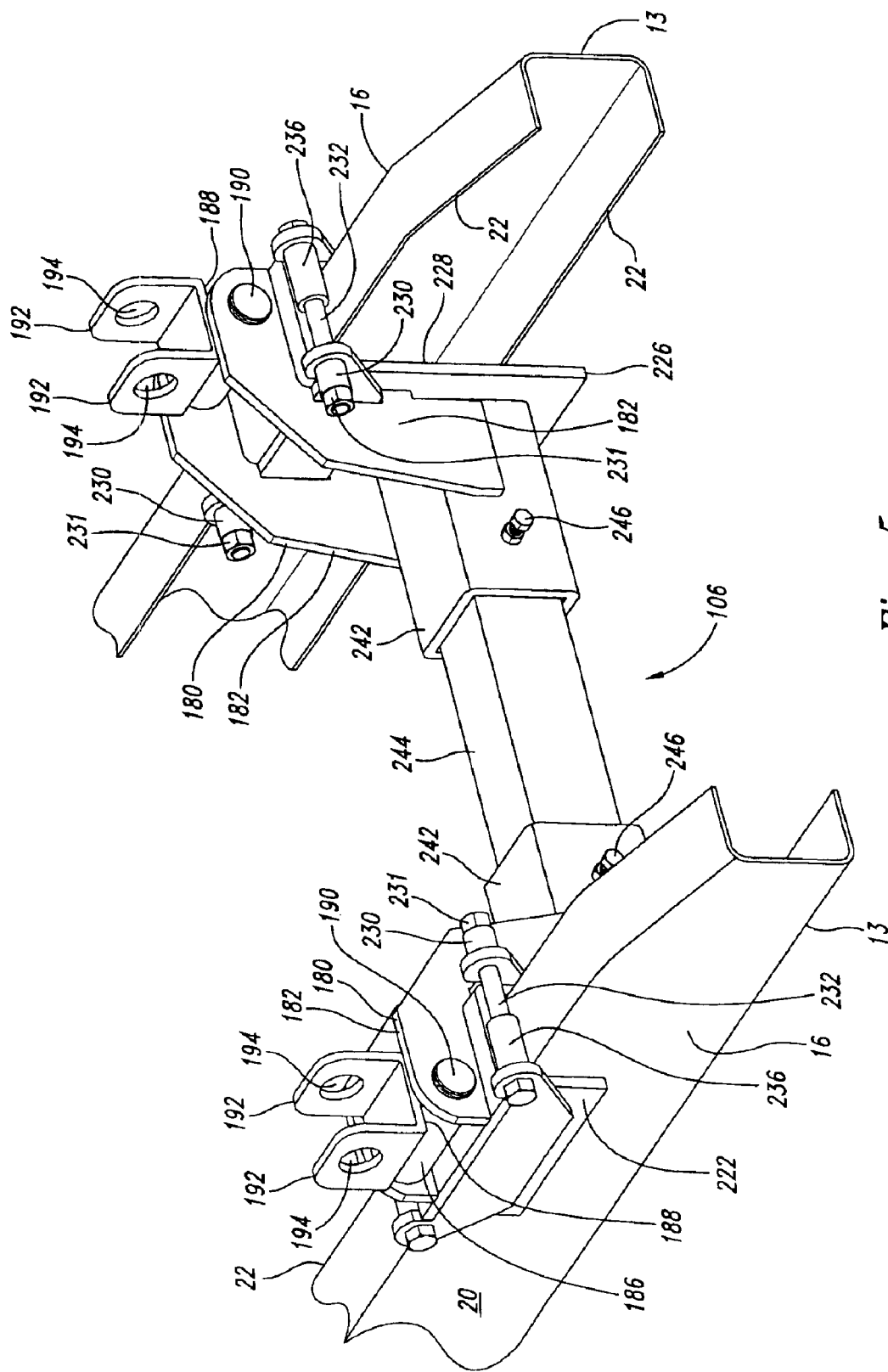
FIG. 5 is an enlarged isometric view of the rear frame connector assembly showing details of connection to the frame of the conventional fifth wheel vehicle of FIG. 3.

Positioning of the front frame connectors 104 and the rear frame connector assembly 106 is shown in FIG. 3. One of the front frame connectors is placed on each of the two front frame portions 14 of the fifth wheel vehicle 10. The rear frame connector assembly 106 is positioned to span between the two rear frame portions 16 of the fifth wheel vehicle 10 to be connected to the two rear frame portions by two frame connectors 220 found on either end of the rear frame connector assembly as shown in FIGS. 4 and 5. Each frame connector 220 includes an outer vertical plate 222 having an interior surface 224 to press against a exterior surface of one of the rear frame portions 16 and an inner vertical plate 226 having an opposing interior surface 228 to press against interior edge surfaces of the same one of the rear frame portions to result in clamping each frame connector to one of the rear frame portions 16 of the fifth wheel vehicle 10.

A threaded receiver 230 is connected to the inner vertical plate 226. At the end of the receiver 230 is a nut 231 to threadably couple a bolt 232, which is passed through hole structures 234 positioned on either end of the outer vertical plate 222 in a guide structure 236 integral to the vertical plate. The guide structure 236 further includes a slotted region 238 formed in part by spacing between the hole structures 234 in the guide structure 236. The slotted region 238 is shaped and sized to allow the slotted region to be placed under and adjacent a horizontal plate 240 that is attached to a top portion of the inner vertical plate 226. Each of two cross member connectors 242 made from hollow and open ended square tube stock are connected to each of the frame connectors 220 and are positioned to extend toward one another with their open ends facing each other.

One end of a cross member 244 made from a square tube member with outside dimensions slightly smaller than the inside dimensions of the two cross member connectors 242 is inserted into to each open end of the cross member connectors 242. The amount of distance that the cross member 244 is inserted into each of the cross member connectors 242 determines the spacing between the two frame connectors 220 so that the spacing can be adjusted to fit the spacing of the two rear frame portions from one another. Once proper spacing of the frame connectors 220 from one another is determined, the cross member 244 can be secured by bolts 246 to the cross member connectors 242.

Figure 6:
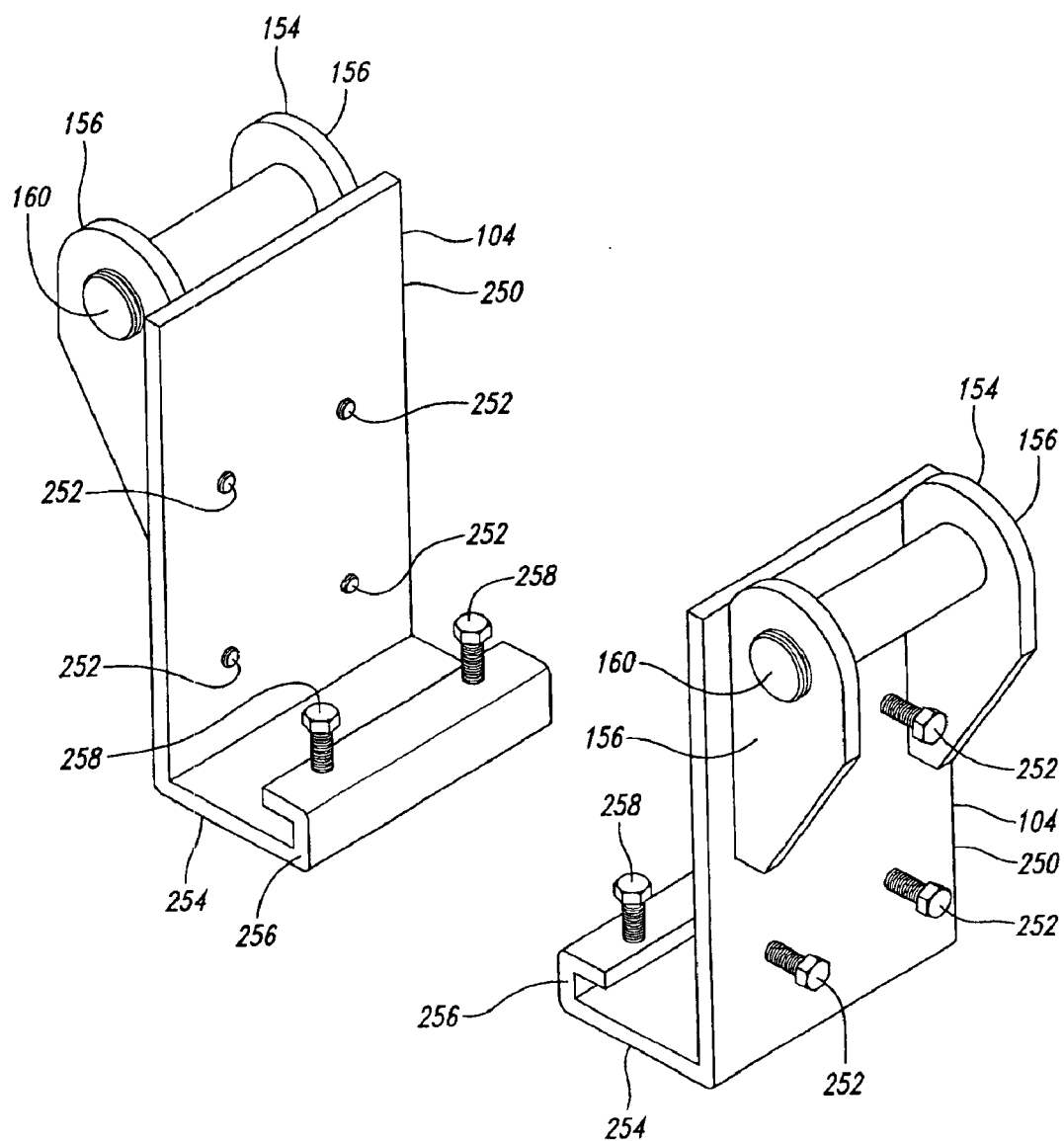
FIG. 6 is an enlarged isometric view of the front frame connectors of FIG. 3.
Figure 7:
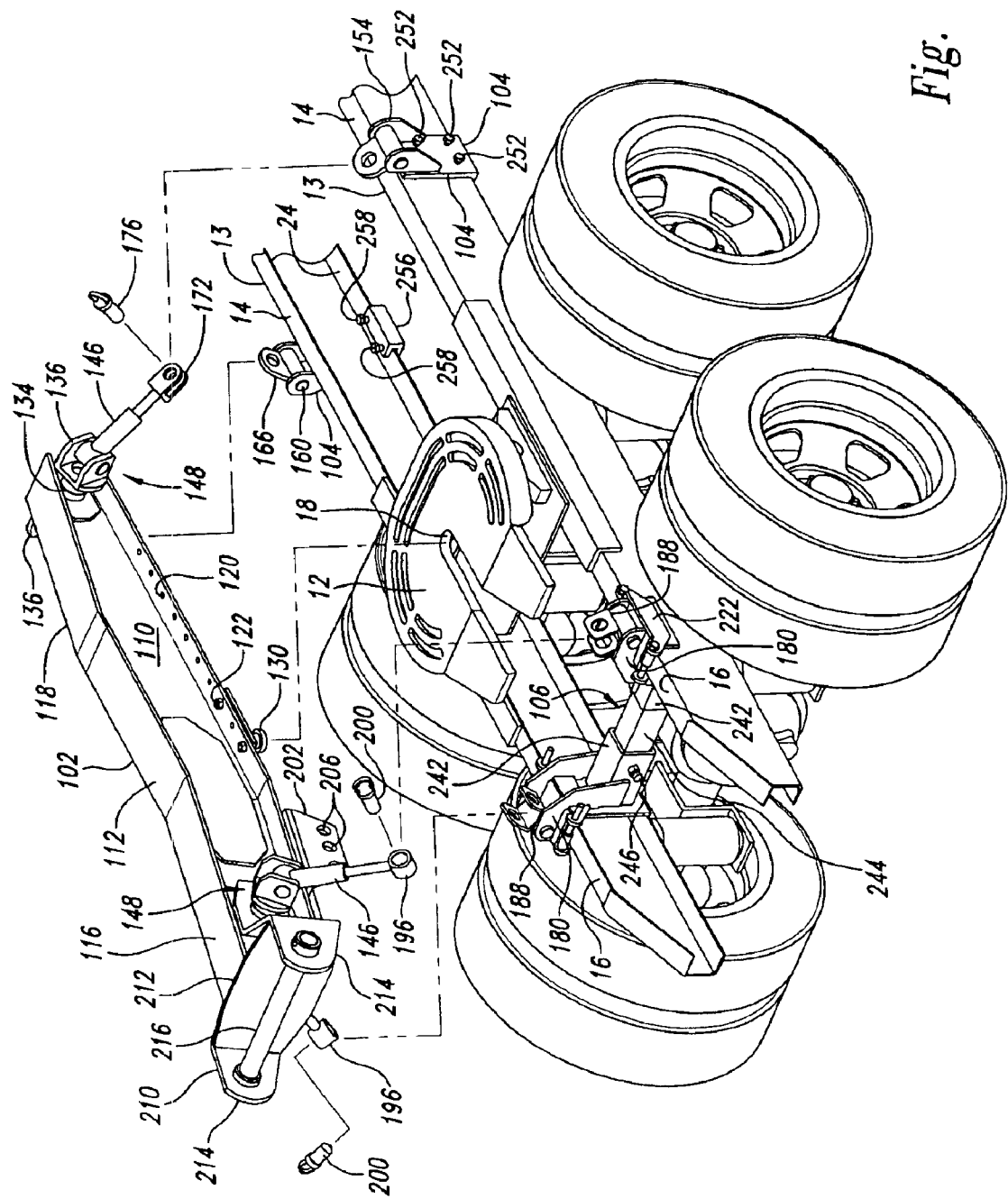
FIG. 7 is an isometric view of the rear frame connector assembly and the front frame connectors showing details of connection to the frame of the conventional fifth wheel vehicle of FIG. 3 and an isometric view of the longitudinal beam assembly showing positioning details with respect to the rear frame connector assembly and the front frame connectors.

The two front frame connectors 104 are shown in FIG. 6 to each have a vertical plate 250 with bolts 252 threadably projecting through the vertical plate to frictionally engage with one of the exterior surfaces 20 of one of the front frame portions 14. Each of the front frame connectors 104 further has a horizontal plate 254 with a channel 256 that engages a lower lip portion 24 of one of the front frame portions 14 as shown in FIG. 7. Bolts 258 are used to clamp down on to the lower lip portion 24 to further secure each of the front frame connectors 104 to one of the front frame portions 14.

Figure 8:
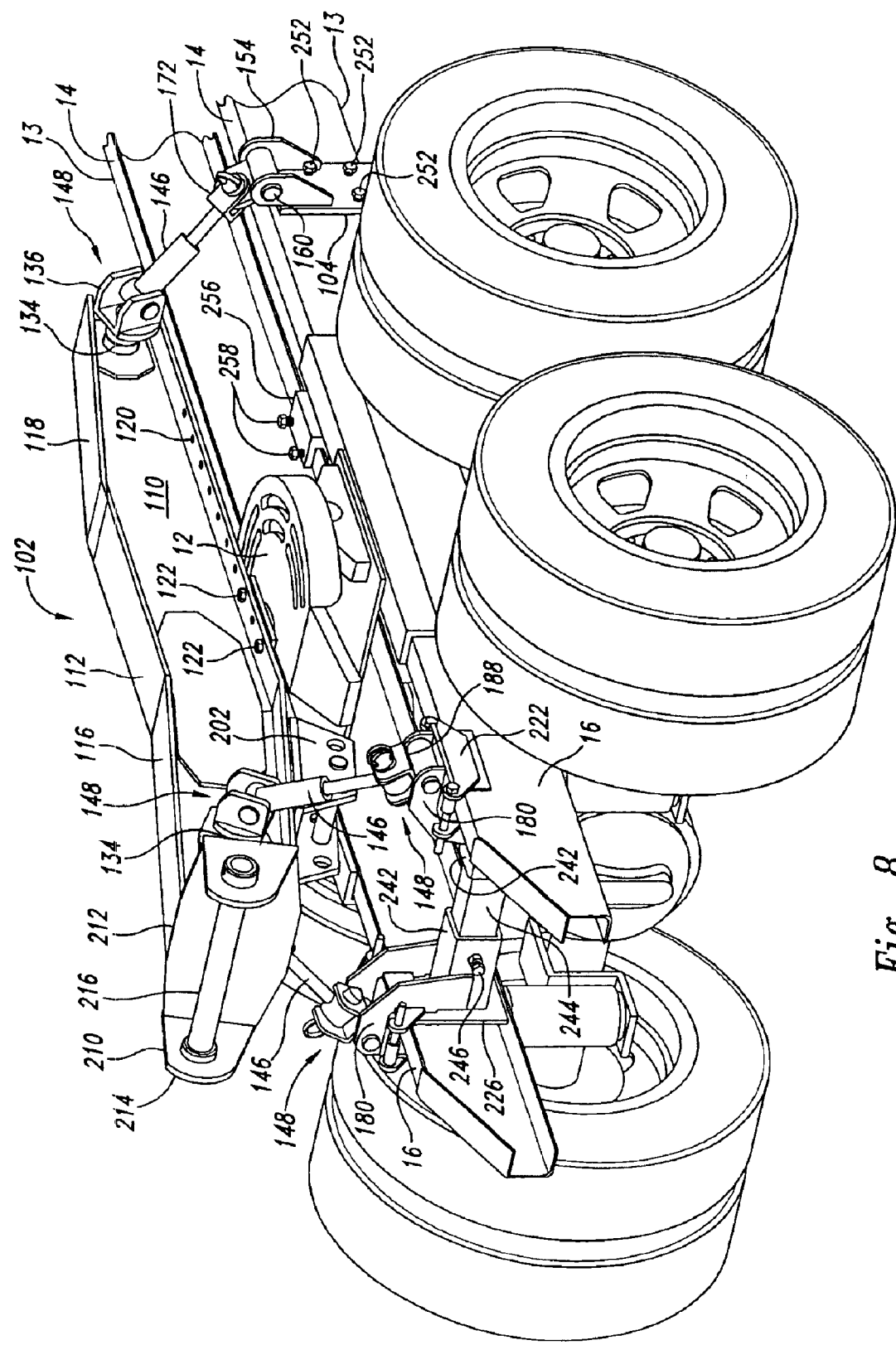
FIG. 8 is an isometric view showing the longitudinal beam assembly of FIG. 7 as connected to the frame of the conventional fifth wheel vehicle through use of the rear frame connector assembly and the front frame connectors of FIG. 3.
Figure 9:
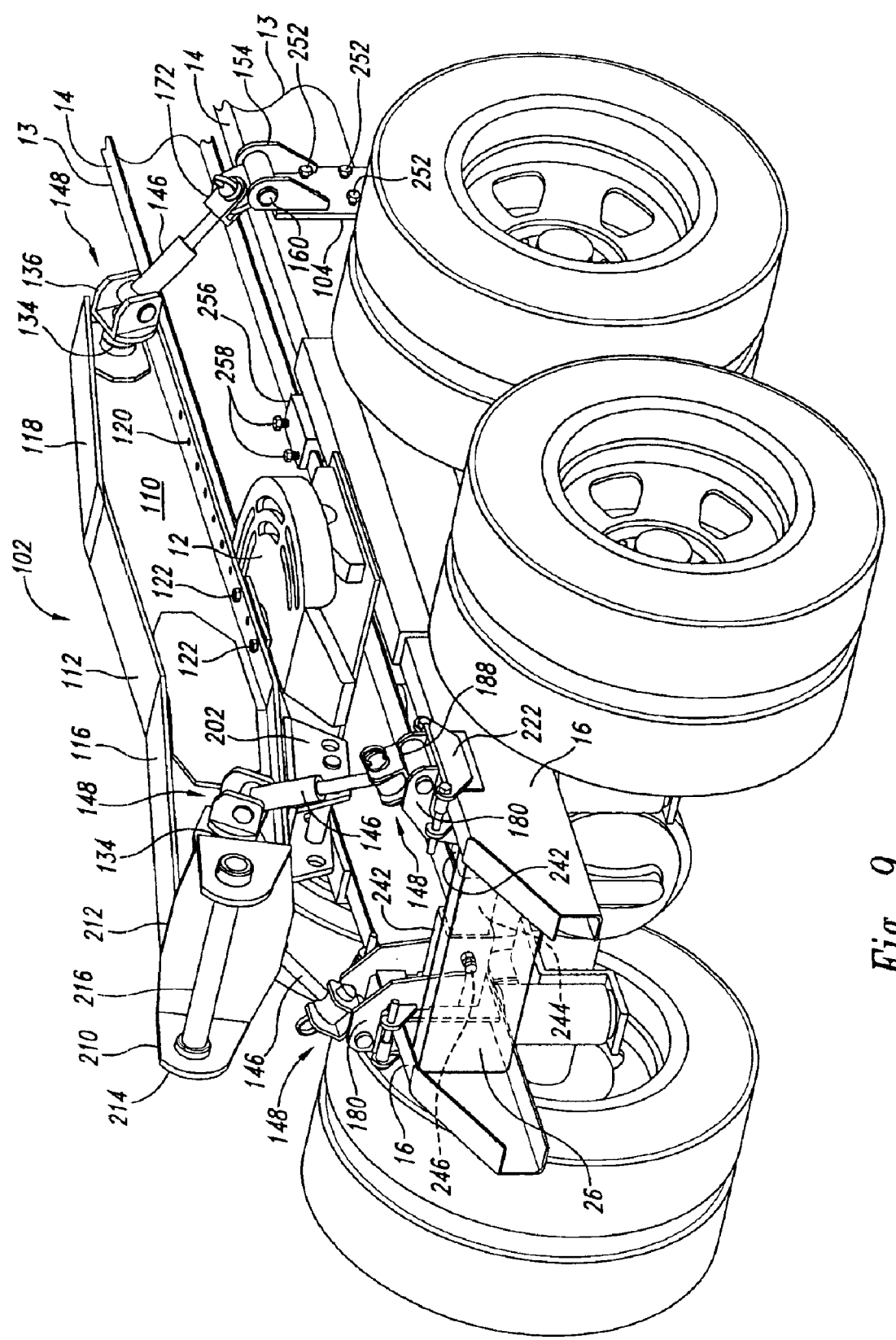
FIG. 9 is an isometric view of the longitudinal beam assembly, the rear frame connector assembly and the front frame connectors of FIG. 8 connected to a conventional fifth wheel vehicle having a frame with the cross frame portion being retained.

Generally the front frame connectors 104 are connected to the front frame portions 14 and the rear frame connector assembly 106 is connected to the rear frame portions 16 prior to connection of the longitudinal beam assembly 102 as conceptually depicted in FIG. 7. Subsequently, the longitudinal beam assembly 102 is connected to the fifth wheel vehicle 10 by coupling of the kingpin 130 with the fifth wheel slot 18, connecting the front coupling rods 146' with the front frame connectors 104 and connecting the rear coupling rods 146" with the rear frame connector assembly 106 as depicted in FIG. 8. In some implementations, the rear frame connector assembly 106 adds support otherwise missing due to removal of a cross frame portion 26 of the fifth wheel vehicle possibly due to obstruction issues raised by the cross frame portion. In other implementations obstruction or other issues do not require removal of the cross frame portion 26 as shown in FIG. 9.

Figure 10:
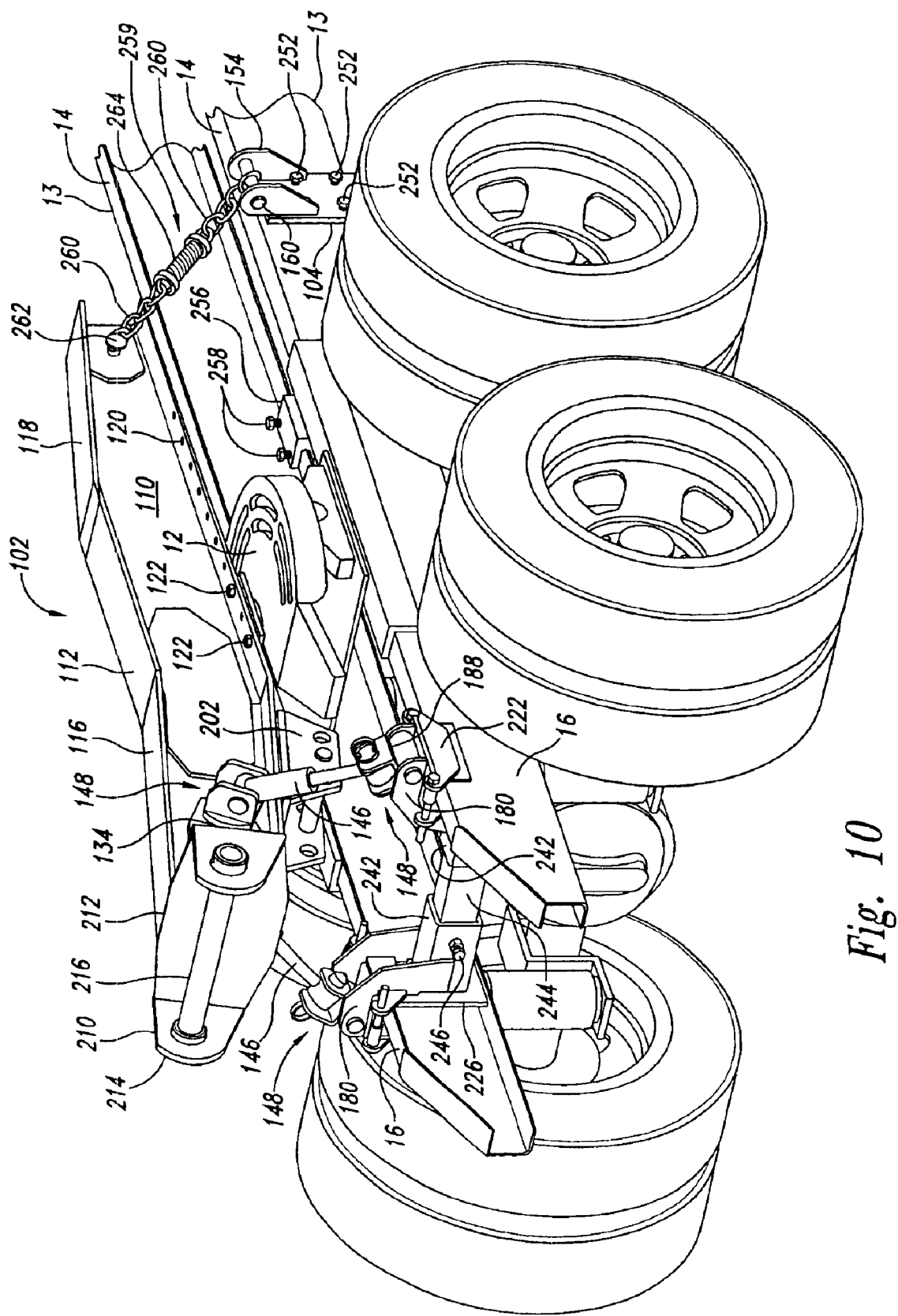
FIG. 10 is an isometric view of the rear frame connector assembly of FIG. 8 connected to an alternative longitudinal beam assembly using chain assemblies to connect to front frame connectors.
Figure 11:
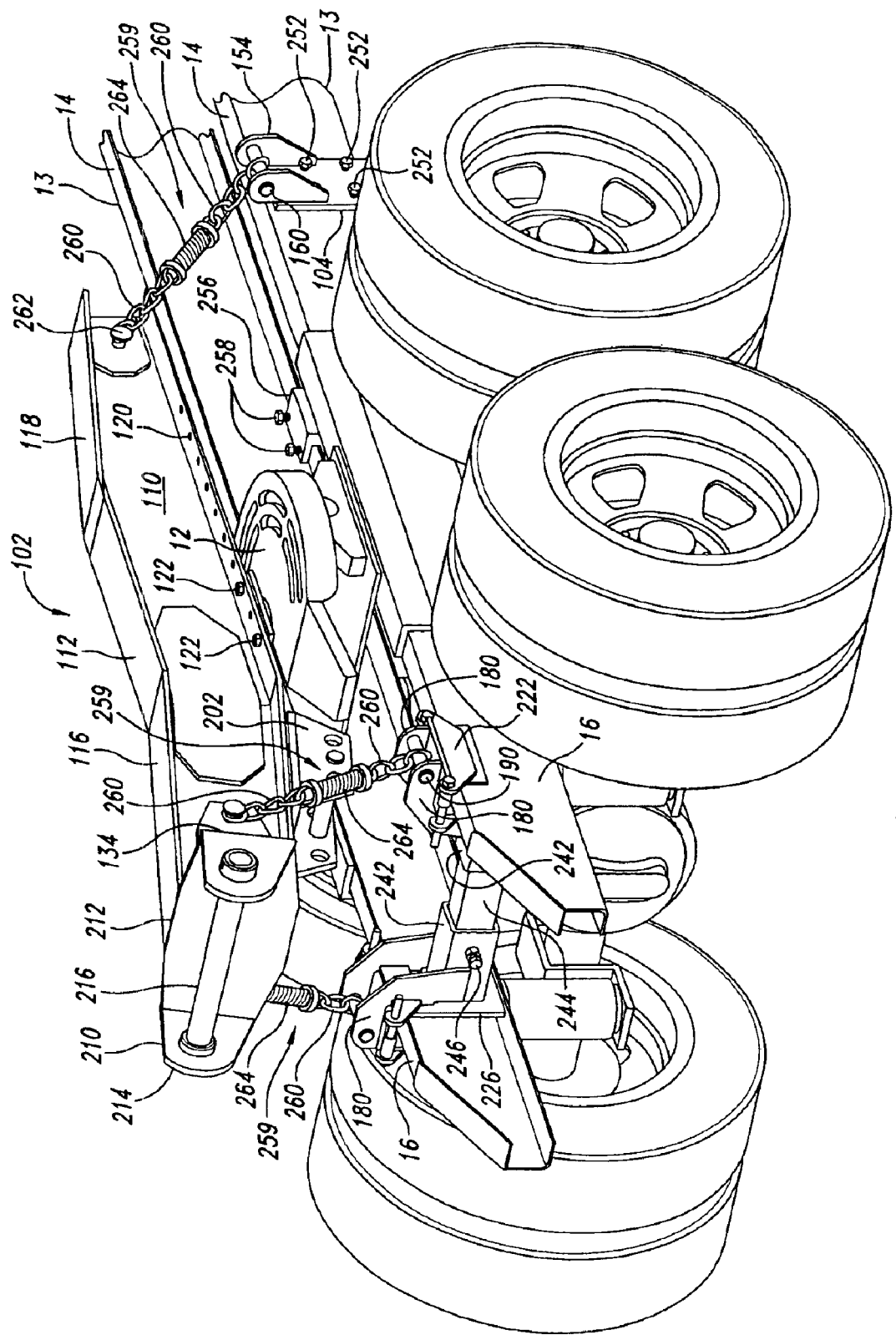
FIG. 11 is an isometric view of the rear frame connector assembly of FIG. 8 connected to an alternative longitudinal beam assembly using chain assemblies to connect to front frame connectors and the rear frame connector assembly.

Alternative implementations use other types of attachment devices to connect the longitudinal beam assembly 102 to the fifth wheel vehicle 10. For instance, chain assemblies 259 each having chains 260 tensioned by a chain tensioner 264 and attached to a chain bracket 264 on the longitudinal beam assembly 102 and attached to the front frame connectors 104, shown in FIG. 10, can be used to connect the longitudinal beam assembly to the front frame portions. In addition chain assemblies 259 can be connected to the rear frame connector assembly 106 to connect the longitudinal beam assembly 102 to the rear frame portions 16 as shown in FIG. 11.

Figure 12:
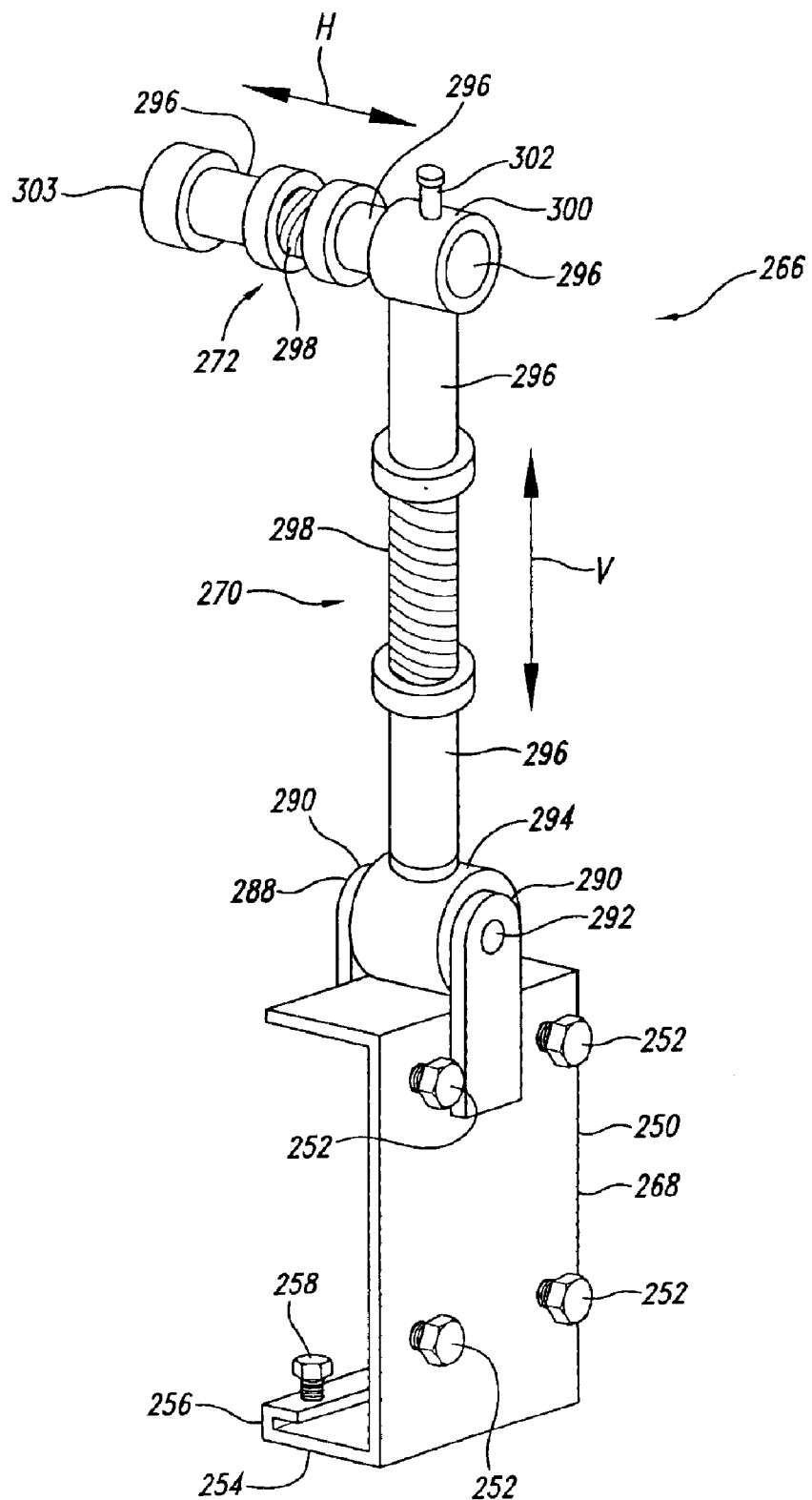
FIG. 12 is an enlarged isometric view of a dual rod connector.
Figure 13:
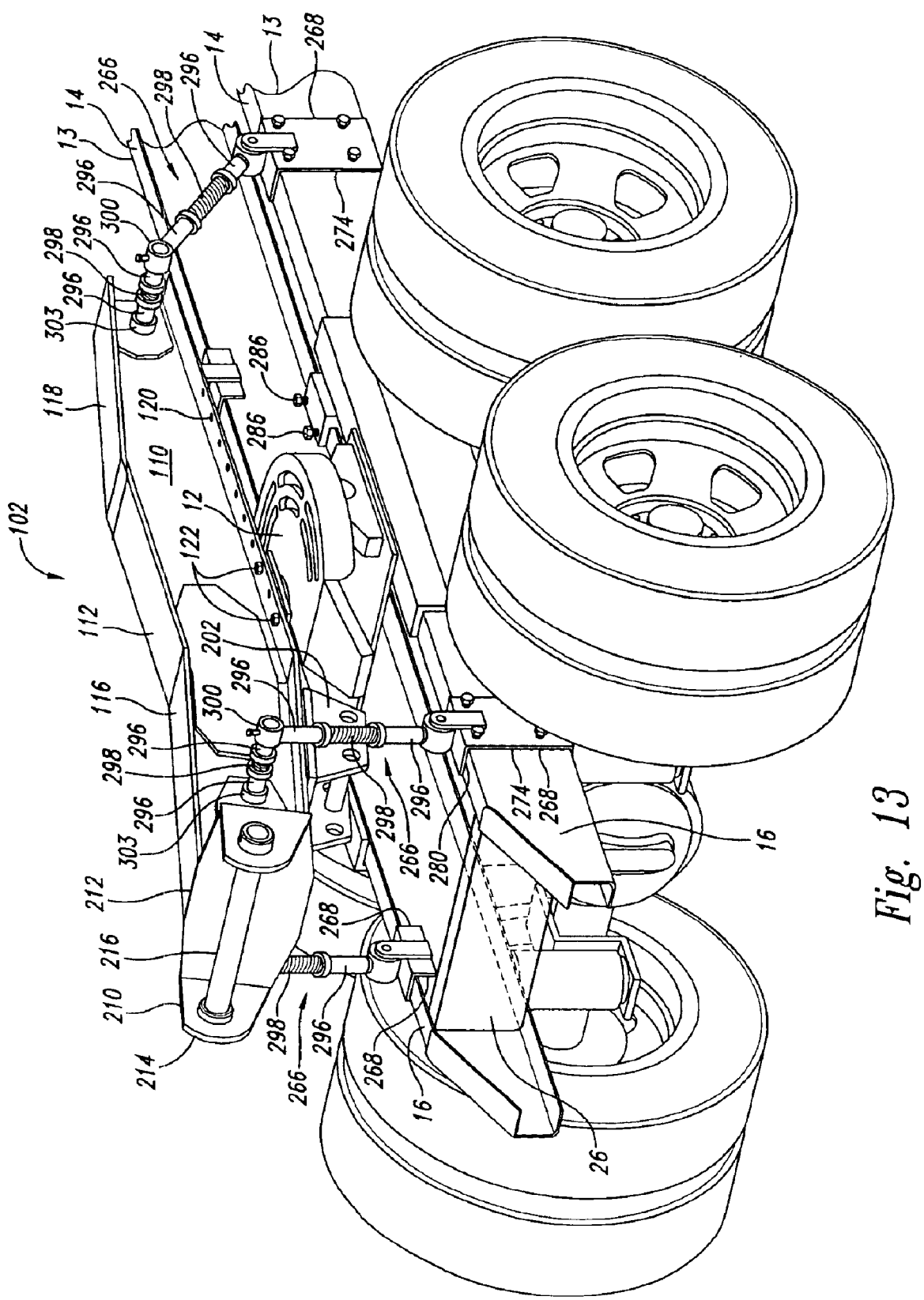
FIG. 13 is an isometric view of an alternative longitudinal beam assembly connected to the frame of a conventional fifth wheel vehicle using the dual rod connector of FIG. 12.

As another example of an alternative attachment device, a dual rod connector 266, depicted in FIGS. 12 and 13, can be used to attach the longitudinal beam assembly 102 to the front frame portions 14 and the rear frame portions 16 of the fifth wheel vehicle 10. The dual rod connector 266 includes a frame connector 268, a first rod 270, and a second rod 272. The frame connector 268 is used to connect the dual rod connector 266 with the front frame portions 14 and the rear frame portions 16. The frame connector 268 includes the vertical plate 250, the bolts 252, the horizontal plate 254, the channel 256, and the bolts 258 of the front frame connectors 104. The frame connector 268 further includes a horizontal top plate 280 that supports a pivot bracket 288 with support members 290 that are coupled by a pin 292 to a cylinder 294 that provides rotational movement for the first rod 270 about a first horizontal axis.

The first rod 270 and the second rod 272 include fixed portions 296 and adjustment portions 298. The adjustment portions 298 provide length adjustment along the V direction, shown in FIG. 12, for the first rod 270 and along the H direction for the second rod 272. For the first rod 270, one of the fixed portions 296 is fixedly attached to the cylinder 294 while another of the fixed portions is fixedly attached to a cylinder 300. For the second rod 272, one of the fixed portions 296 is rotationally coupled to the cylinder 300 to provide rotational movement of the first rod 270 about a second horizontal axis. Once placement of the frame connector 268 is determined, the resultant angular orientation of the first rod 270 can be secured with tightening of a set screw 302 threadably attached to the cylinder 300.

Figure 14:
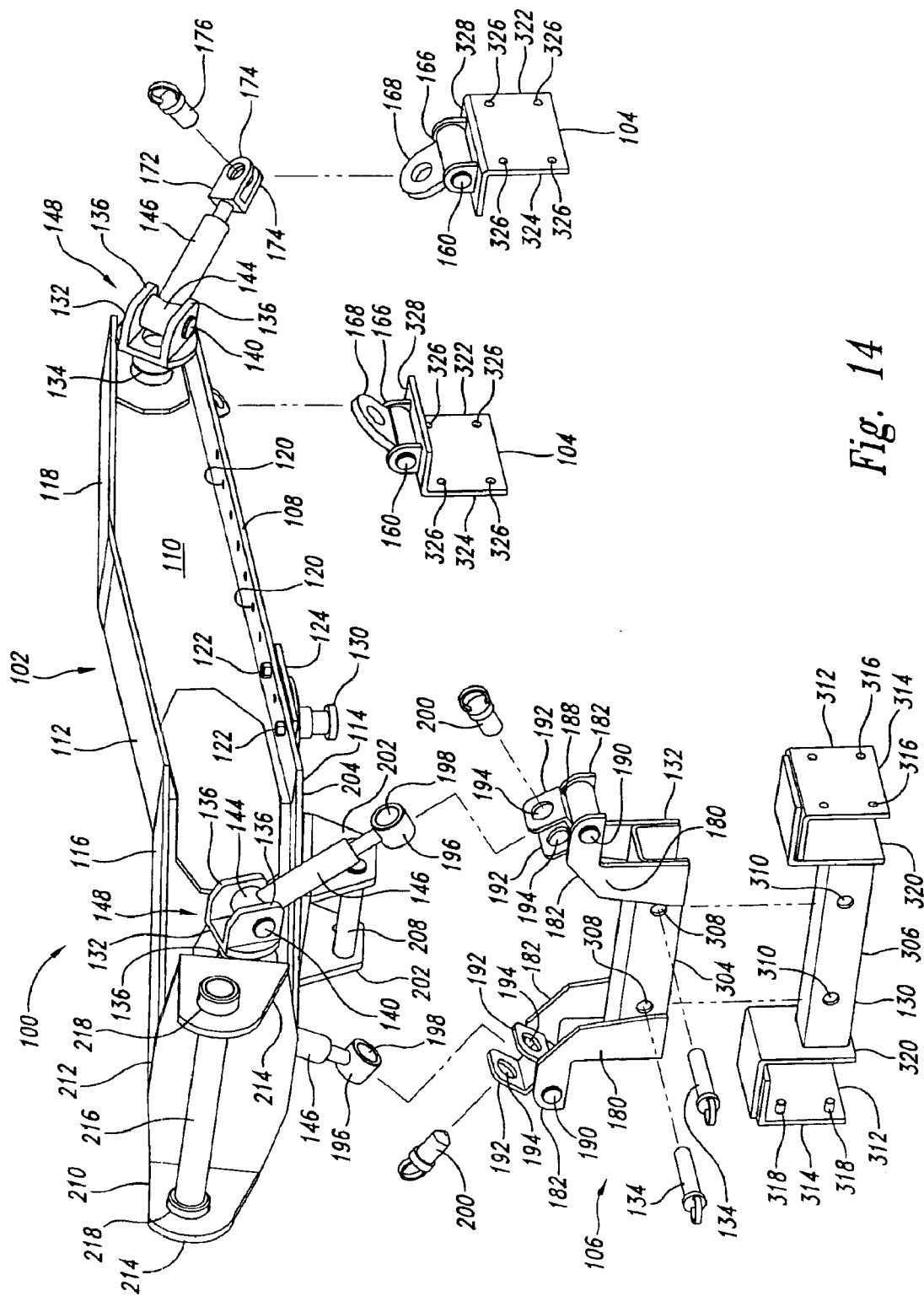
FIG. 14 is an exploded isometric view of an alternative rear frame connector assembly and front frame connectors shown in relation to the longitudinal beam assembly of FIG. 2.

An alternate implementation of the rear frame connector assembly 106 is shown in FIG. 14 as having a top cross member 304 sized to fit over a bottom cross member 308 such that holes 308 in the top cross member align with holes 310 in the bottom cross member to receive pins 311 thereby securing the top cross member with the bottom cross member. The bottom cross member 308 further includes saddle connectors 312 to straddle the rear frame portions 16 having an outside plate 314 with holes 316 for insertion of bolts 318 to secure the saddle connectors to the rear frame portions. The saddle connectors 312 each further have an inside plate such that when each of the saddle connectors straddle the respective one of the rear frame portions 16, the outside plate of the saddle connector is adjacent to the exterior surface 20 of the rear frame portion and the inside plate is adjacent to the interior edge surfaces 22 of the rear frame portion.

An alternative implementation of the front frame connectors 104 is shown in FIG. 14 as having an L-bracket 322 with holes 326 to receive bolts (not shown) for bolting the L-bracket of each of the alternative front frame connectors to one of the front frame connectors 104. The alternative implementation of the front frame connectors 104 further includes one of the tube-plate members 166 fixedly attached to a horizontal portion 328 of each of the L-brackets 322 for coupling of the L-bracket with the front coupling rod 146'.

Figure 16:
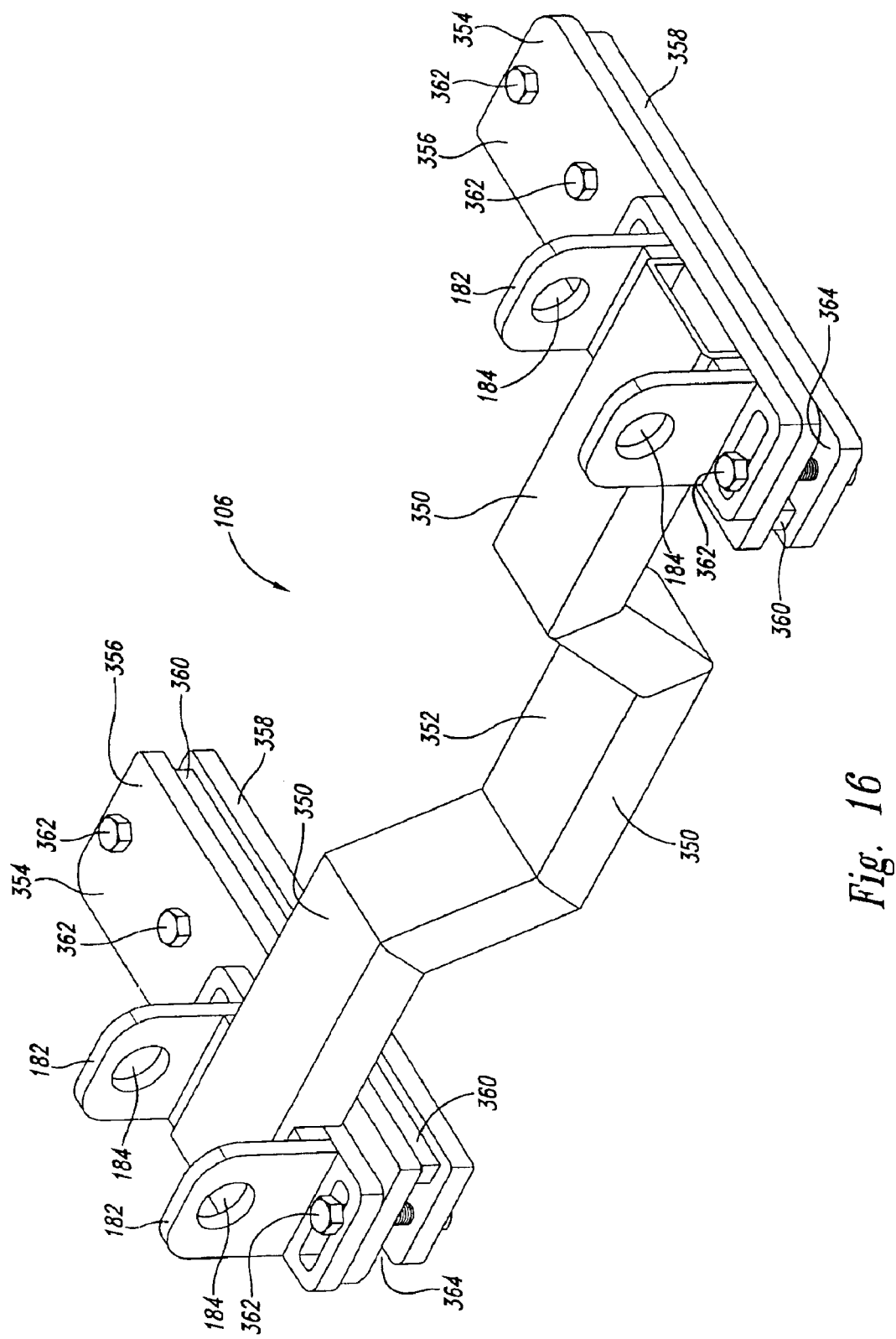
FIG. 16 is an exploded isometric view of an alternative rear frame connector assembly having connector plate assemblies and a cross member with a lowered mid-portion.
Figure 17:
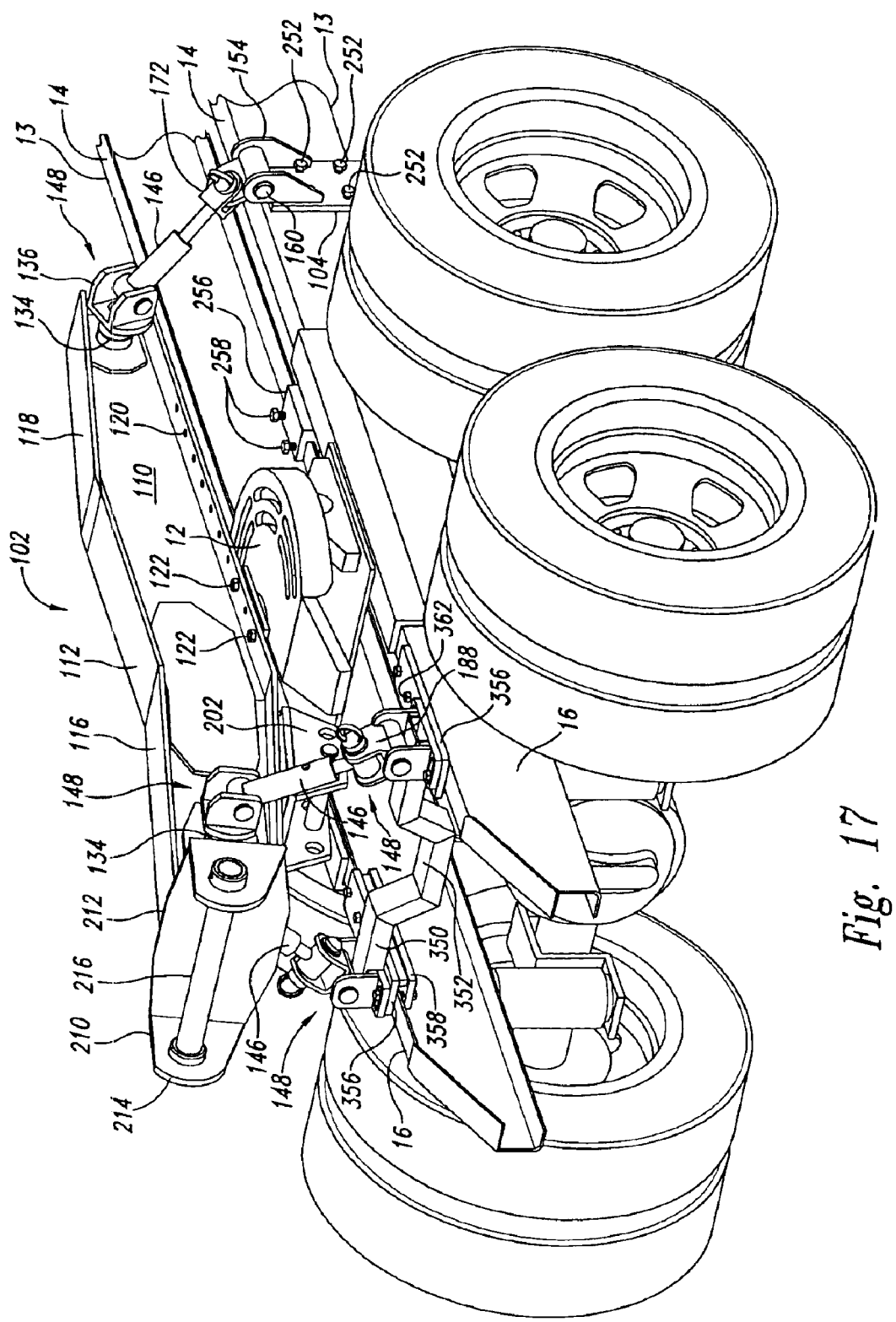
FIG. 17 is an isometric view of the longitudinal beam assembly and alternative frame connector assembly of FIG. 16 shown connected to the frame of a conventional fifth wheel vehicle with the longitudinal beam assembly being further connected to a lift.

An alternate implementation of the rear frame connector assembly 106 is shown in FIGS. 16 and 17 as having a cross member 350 spanning between two connector plate assemblies 354. The connector plate assemblies 354 have a top plate 356, a bottom plate 358 and a mid-plate 360 therebetween along an inner longitudinal half 361 of the connector plate assemblies. The support plates 182 are coupled to each of the connector plate assemblies 354 by two of four bolt assemblies 362 used to couple the connector plate assemblies to the rear frame portions 16 as shown in FIG. 17 along exterior longitudinal halves 364 of the connector plate assemblies.

Figure 15:
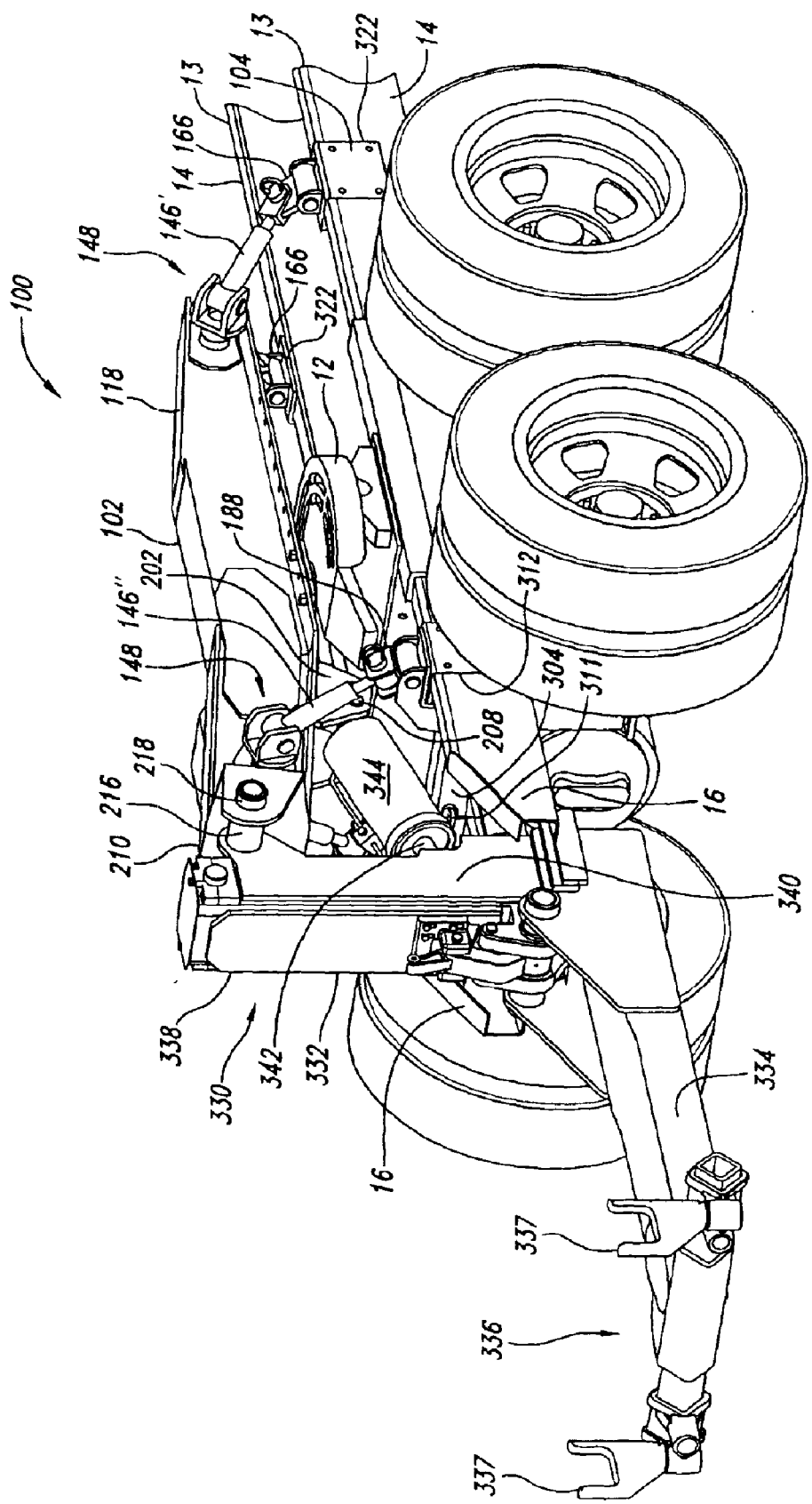
FIG. 15 is an isometric view of the longitudinal beam assembly and alternative frame connector assembly and front frame connectors of FIG. 14 shown connected to the frame of a conventional fifth wheel vehicle with the longitudinal beam assembly being further connected to a lift.

An exemplary implementation of an engagement assembly to engage objects such as vehicles to be lifted and/or towed is a lift assembly 330 attached to one of the depicted implementations of the mounting frame system 100 is shown in FIG. 15. The lift assembly 330 includes a vertical member 332, a horizontal member 334, and an engagement assembly 336 with engagement members 337 to be removably coupled to an object such as a vehicle. A top portion 338 of the vertical member 332 is rotatably coupled to the rod 216 of the lift bracket 210 of the longitudinal beam assembly 102. A mid-portion 340 of the vertical member 332 is attached to a ram 342 of a hydraulic cylinder 344 that is rotatably coupled to the pin 208 of the piston bracket 202 of the longitudinal beam assembly 102. These attachments allow the hydraulic cylinder to raise and lower the engagement assembly 336 and a portion of an object such as a vehicle that is removably coupled to the engagement assembly.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. For instance, the longitudinal beam assembly 102 need not be shaped as particularly depicted as long as it retains the general appearance of a member being directly supported by the fifth wheel plate 12 and having coupling members, such as the front and rear coupling rods 146' and 146", extending from the longitudinal beam assembly and attached to areas of the fifth wheel vehicle's frame, such as the front frame portions 20 and the rear frame portions 22, so that the surface of the longitudinal beam assembly in contact with the fifth wheel plate maintains impartation of a positive value of force on to the fifth wheel plate.

The coupling members can be of other configurations than those depicted, such as commonly known rachet binders, as long as the length of the coupling members and angle of orientation of the coupling member with respect to the longitudinal beam assembly 102 are sufficiently variable to allow for adjustment in position where the coupling member is attached to the front frame portions 20 and the rear frame portions 22. Adjustment in placement of attachment members used to attach the coupling members, such as the front frame connectors 104 and the rear frame connector assembly 106, to the longitudinal beam assembly 102 along the longitudinal frame members 13 of the fifth wheel vehicle 10 can be necessary since other items can be affixed to the longitudinal frame members that may not be known or predictable prior to installation of the mounting frame system 100 on to the.

Depicted methods for allowing the coupling members to adapt included the various two-axis joints used in connecting depicted versions of the coupling members to the longitudinal beam assembly 102 and the depicted attachment members coupled to the longitudinal frame members 13. Other depicted methods to provide capability for the coupling members to accommodate varying placement of where the attachment members are coupled to the longitudinal frame members 13 include use of chains or dual rod connectors. Other kinds of attachment portion placement accommodation mechanisms for the coupling members can be used that allow for change in length of the coupling members Also, the depicted implementations had coupling members extending from longitudinal beam assembly 102, however, other numbers of coupling members could be used depending upon placement and loading characteristics of the longitudinal beam assembly on the fifth wheel plate 12 and of the object, such as a vehicle, being coupled to the longitudinal beam assembly either directly or through another member such as the lift assembly 330 to be lifted and/or towed. As another example, depicted embodiments of the front frame connectors 104 and the rear frame connectors 106 showed them being connected to the front frame portions 20 and the rear frame portions 22 by frictional engagement of bolts contacting the frame portions or by bolts being screwed into the frame portions, however methods conventionally available can be used, such as welding, to fixedly attached the connectors to the frame portions.

As a further example, other sorts of coupling systems besides the lift assembly 330 as depicted can be connected to the longitudinal beam assembly 102 for such applications as towing a vehicle without lifting the vehicle and for lifting or towing other sorts of objects besides a vehicle. Additionally, the depicted implementations were shown with use of the kingpin 130, however, in other implementations, the kingpin is not used. Accordingly, the invention is not limited except as by the appended claims.

What is claimed is:

1. A system to be connected to a vehicle, the vehicle having a fifth wheel plate, comprising:
   a beam with a rearward portion, a forward portion, and a mid-portion between the rearward and forward portions along a longitudinal dimension, the beam having a surface on the mid-portion configured for placement on top of the fifth wheel plate when the system is in an operational position on the vehicle;
   a plurality of two-axis joints;
   a first rigid member having a first end coupled to a first of the two-axis joints and a second end coupled to a second of the two-axis joints, the first of the two-axis joints coupled to the rearward portion of the beam;
   a second rigid member having a first end coupled to a third of the two-axis joints and a second end coupled to a fourth of the two-axis joints, the third of the two-axis joints coupled to the rearward portion of the beam;
   a third rigid member having a first end coupled to a fifth of the two-axis joints and a second end coupled to a sixth of the two-axis joints, the fifth of the two-axis joints coupled to the forward portion of the beam;
   a fourth rigid member having a first end coupled to a seventh of the two-axis joints and a second end coupled to a eighth of the two-axis joints, the seventh of the two-axis joints coupled to the forward portion of the beam; and
   an engagement assembly coupled to the beam.

2. A system comprising:
   a vehicle, the vehicle having a fifth wheel plate, a driver compartment, and first and second frame members substantially parallel and extending rearwardly away from the driver compartment on either side of the fifth wheel plate, the first and second frame members each having forward portions located nearer to the driver compartment than the fifth wheel plate is to the driver compartment, the first and second frame members each having rearward portions located farther from the driver compartment than the fifth wheel plate is from the driver compartment;
   a beam with a rearward portion, a forward portion, and a mid-portion between the rearward and forward portions along a longitudinal dimension, the beam having a surface on the mid-portion configured for placement on top of the fifth wheel plate when the system is in an operational position on the vehicle;
   a plurality of two-axis joints;
   a first rigid member having a first end coupled to a first of the two-axis joints and a second end coupled to a second of the two-axis joints, the first two-axis joints coupled to the rearward portion of the beam, the second two-axis joint coupled to the rearward portion of the first frame member;
   a second rigid member having a first end coupled to a third of the two-axis joints and a second end coupled to a fourth of the two-axis joints, the third two-axis joints coupled to the rearward portion of the beam, the fourth two-axis joint coupled to the rearward portion of the second frame member;
   a third rigid member having a first end coupled to a fifth of the two-axis joints and a second end coupled to a sixth of the two-axis joints, the fifth of the two-axis joints coupled to the forward portion of the beam, the sixth two-axis joint coupled to the forward portion of the first frame member;
   a fourth rigid member having a first end coupled to a seventh of the two-axis joints and a second end coupled to a eighth of the two-axis joints, the seventh two-axis joints coupled to the forward portion of the beam, the eighth two-axis joint coupled to the forward portion of the second frame member; and
   an engagement assembly coupled to the beam.

3. A system to be connected to a vehicle, the vehicle having a fifth wheel plate, comprising:
   a beam with a rearward portion, a forward portion, and a mid-portion between the rearward and forward portions along a longitudinal dimension, the beam having a surface on the mid-portion configured for placement on top of the fifth wheel plate when the system is in an operational position on the vehicle;
   a plurality of two-axis joints;
   a first rigid member having a first end coupled to a first of the two-axis joints and a second end coupled to a second of the two-axis joints, the first of the two-axis joints coupled to the rearward portion of the beam, the first rigid member having a length between the first end and the second end that is mechanically adjustable;

a second rigid member having a first end coupled to a third of the two-axis joints and a second end coupled to a fourth of the two-axis joints, the third of the two-axis joints coupled to the rearward portion of the beam, the second rigid member having a length between the first end and the second end that is mechanically adjustable;

a third rigid member having a first end coupled to a fifth of the two-axis joints and a second end coupled to a sixth of the two-axis joints, the fifth of the two-axis joints coupled to the forward portion of the beam, the third rigid member having a length between the first end and the second end that is mechanically adjustable;

a fourth rigid member having a first end coupled to a seventh of the two-axis joints and a second end coupled to a eighth of the two-axis joints, the seventh of the two-axis joints coupled to the forward portion of the beam, the fourth rigid member having a length between the first end and the second end that is mechanically adjustable; and an engagement assembly coupled to the beam.

4. A system comprising:

a vehicle, the vehicle having a fifth wheel plate, a driver compartment, and first and second frame members substantially parallel and extending rearwardly away from the driver compartment on either side of the fifth wheel plate, the first and second frame members each having forward portions located nearer to the driver compartment than the fifth wheel plate is to the driver compartment, the first and second frame members each having rearward portions located farther from the driver compartment than the fifth wheel plate is from the driver compartment;

a beam with a rearward portion, a forward portion, and a mid-portion between the rearward and forward portions along a longitudinal dimension, the beam having a surface on the mid-portion configured for placement on top of the fifth wheel plate when the system is in an operational position on the vehicle;

a plurality of two-axis joints;

a first rigid member having a first end coupled to a first of the two-axis joints and a second end coupled to a second of the two-axis joints, the first two-axis joints coupled to the rearward portion of the beam, the second two-axis joint coupled to the rearward portion of the first frame member, the first rigid member having a length between the first end and the second end that is mechanically adjustable;

a second rigid member having a first end coupled to a third of the two-axis joints and a second end coupled to a fourth of the two-axis joints, the third two-axis joints coupled to the rearward portion of the beam, the fourth two-axis joint coupled to the rearward portion of the second frame member, the second rigid member having a length between the first end and the second end that is mechanically adjustable;

a third rigid member having a first end coupled to a fifth of the two-axis joints and a second end coupled to a sixth of the two-axis joints, the fifth of the two-axis joints coupled to the forward portion of the beam, the sixth two-axis joint coupled to the forward portion of the first frame member, the third rigid member having a length between the first end and the second end that is mechanically adjustable;

a fourth rigid member having a first end coupled to a seventh of the two-axis joints and a second end coupled to a eighth of the two-axis joints, the seventh two-axis joints coupled to the forward portion of the beam, the eight two-axis joint coupled to the forward portion of the second frame member, the fourth rigid member having a length between the first end and the second end that is mechanically adjustable; and an engagement assembly coupled to the beam.

5. A system to be connected to a vehicle, the vehicle having a fifth wheel plate, comprising:

a beam with a rearward portion, a forward portion, and a mid-portion between the rearward and forward portions along a longitudinal dimension, the beam having a surface on the mid-portion configured for placement on top of the fifth wheel plate when the system is in an operational position on the vehicle;

a plurality of one-axis joints;

a first rigid member having a first end coupled to a first of the one-axis joints and a second end coupled to the rearward portion of the beam, the first rigid member having a length between the first end and the second end that is mechanically adjustable;

a second rigid member with a first end coupled to the first one-axis joint and a second end coupled to a second of the one-axis joints, the second rigid member having a length between the first end and the second end that is mechanically adjustable;

a third rigid member having a first end coupled to a third of the one-axis joints and a second end coupled to the rearward portion of the beam, the third rigid member having a length between the first end and the second end that is mechanically adjustable;

a fourth rigid member with a first end coupled to the third one-axis joint and a second end coupled to a fourth of the one-axis joints, the fourth rigid member having a length between the first end and the second end that is mechanically adjustable;

a fifth rigid member having a first end coupled to a fifth of the one-axis joints and a second end coupled to the forward portion of the beam, the fifth rigid member having a length between the first end and the second end that is mechanically adjustable;

a sixth rigid member with a first end coupled to the fifth one-axis joint and a second end coupled to a sixth of the one-axis joints, the sixth rigid member having a length between the first end and the second end that is mechanically adjustable;

a seventh rigid member having a first end coupled to a seventh of the one-axis joints and a second end coupled to the forward portion of the beam, the seventh rigid member having a length between the first end and the second end that is mechanically adjustable;

an eigth rigid member with a first end coupled to the seventh one-axis joint and a second end coupled to an eigth of the one-axis joints, the eigth rigid member having a length between the first end and the second end that is mechanically adjustable; and an engagement assembly coupled to the beam.

6. A system comprising:

a vehicle, the vehicle having a fifth wheel plate, a driver compartment, and first and second frame members substantially parallel and extending rearwardly away from the driver compartment on either side of the fifth wheel plate, the first and second frame members each having forward portions located nearer to the driver compartment than the fifth wheel plate is to the driver compartment, the first and second frame members each having rearward portions located farther from the driver compartment than the fifth wheel plate is from the driver compartment;

a beam with a rearward portion, a forward portion, and a mid-portion between the rearward and forward portions along a longitudinal dimension, the beam having a surface on the mid-portion configured for placement on top of the fifth wheel plate when the system is in an operational position on the vehicle;

a beam with a rearward portion, a forward portion, and a mid-portion between the rearward and forward portions along a longitudinal dimension, the member having a surface on the mid-portion configured for placement on top of the fifth wheel plate when the system is in an operational position on the vehicle;

a plurality of one-axis joints;

a first rigid member having a first end coupled to a first of the one-axis joints and a second end coupled to the rearward portion of the beam, the first rigid member having a length between the first end and the second end that is mechanically adjustable;

a second rigid member with a first end coupled to the first one-axis joint and a second end coupled to a second of the one-axis joints, the second one-axis joint coupled to the rearward portion of the first frame member, the second rigid member having a length between the first end and the second end that is mechanically adjustable;

a third rigid member having a first end coupled to a third of the one-axis joints and a second end coupled to the rearward portion of the beam, the third rigid member having a length between the first end and the second end that is mechanically adjustable;

a fourth rigid member with a first end coupled to the third one-axis joint and a second end coupled to a fourth of the one-axis joints, the fourth one-axis joint coupled to the rearward portion of the second frame member, the fourth rigid member having a length between the first end and the second end that is mechanically adjustable;

a fifth rigid member having a first end coupled to a fifth of the one-axis joints and a second end coupled to the forward portion of the beam, the fifth rigid member having a length between the first end and the second end that is mechanically adjustable;

a sixth rigid member with a first end coupled to the fifth one-axis joint and a second end coupled to a sixth of the one-axis joints, the sixth one-axis joint coupled to the forward portion of the first frame member, the sixth rigid member having a length between the first end and the second end that is mechanically adjustable;

a seventh rigid member having a first end coupled to a seventh of the one-axis joints and a second end coupled to the forward portion of the beam, the seventh rigid member having a length between the first end and the second end that is mechanically adjustable;

an eigth rigid member with a first end coupled to the seventh one-axis joint and a second end coupled to an eigth of the one-axis joints, the eighth one-axis joint coupled to the forward portion of the second frame member, the eigth rigid member having a length between the first end and the second end that is mechanically adjustable; and an engagement assembly coupled to the beam.

* * * * *